(12) United States Patent
Mizumura

(10) Patent No.: US 9,283,640 B2
(45) Date of Patent: Mar. 15, 2016

(54) LASER PROCESSING APPARATUS

(71) Applicant: V TECHNOLOGY CO., LTD., Yokohama-shi, Kanagawa (JP)

(72) Inventor: Michinobu Mizumura, Yokohama (JP)

(73) Assignee: V TECHNOLOGY CO., LTD., Yokohama-shi (JP)

( * ) Notice: Subject to any disclaimer, the term of this patent is extended or adjusted under 35 U.S.C. 154(b) by 0 days.

(21) Appl. No.: 13/661,299

(22) Filed: Oct. 26, 2012

(65) Prior Publication Data

US 2013/0284708 A1 Oct. 31, 2013

Related U.S. Application Data

(63) Continuation of application No. PCT/JP2011/059436, filed on Apr. 15, 2011.

(30) Foreign Application Priority Data

Apr. 28, 2010 (JP) ................. 2010-102904

(51) Int. Cl.
*B23K 26/00* (2014.01)
*B23K 26/38* (2014.01)
(Continued)

(52) U.S. Cl.
CPC ........... *B23K 26/381* (2013.01); *B23K 26/0676* (2013.01); *B23K 26/4025* (2013.01); *B23K 26/4075* (2013.01)

(58) Field of Classification Search
CPC .. B23K 26/381; B23K 26/383; B23K 26/385; B23K 26/388; B23K 26/0676; B23K 26/0648; G02B 27/10; G02B 27/12; G02B 27/123
USPC ......... 219/50, 121.6, 121.11, 121.63, 121.64, 219/121.65, 121.66, 121.67, 121.68, 219/121.69, 121.7, 121.73, 121.75, 121.78, 219/121.83, 121.84, 1, 21.85, 121.71, 219/121.76, 121.77; 430/945; 359/621, 359/622, 626

See application file for complete search history.

(56) References Cited

U.S. PATENT DOCUMENTS 6,100,961 A * 8/2000 Shiraishi et al. ................ 355/67
2001/0009251 A1 7/2001 Sekizawa et al.
(Continued)

FOREIGN PATENT DOCUMENTS

JP 03-226392 A 10/1991
JP 2001-269789 A 10/2001
(Continued)

OTHER PUBLICATIONS

English Language Translation of JP2009-297742.*
(Continued)

*Primary Examiner* — Dana Ross
*Assistant Examiner* — Joseph Iskra
(74) *Attorney, Agent, or Firm* — Foley & Lardner LLP

(57) ABSTRACT

The present invention relates to a laser processing apparatus for irradiating a printed wiring board 9 with a laser beam L so as to form holes 22 at a plurality of predetermined positions on the printed wiring board 9. The device includes, from upstream on an optical path of the laser beam: a second fly eye lens 6 that achieves the uniform intensity distribution of the laser beam L; a second condenser lens 7 that collimates the laser beam L emitted from the second fly eye lens 6; and a micro lens array 8 positioned in a manner facing the printed wiring board 9 and having a plurality of micro lenses 19 formed in a manner corresponding to the plurality of positions on the printed wiring board 9.

4 Claims, 5 Drawing Sheets

(51) Int. Cl.
　　*B23K 26/067*　　(2006.01)
　　*B23K 26/40*　　(2014.01)

(56) References Cited

U.S. PATENT DOCUMENTS

| | | | |
|---|---|---|---|
| 2004/0196559 | A1 | 10/2004 | Lissotschenko |
| 2006/0144829 | A1* | 7/2006 | Broude et al. ........... 219/121.68 |
| 2008/0057718 | A1 | 3/2008 | Omata et al. |
| 2009/0032510 | A1* | 2/2009 | Ando et al. .............. 219/121.72 |

FOREIGN PATENT DOCUMENTS

| | | |
|---|---|---|
| JP | 2003-001472 A | 10/2001 |
| JP | 2002-283083 A | 10/2002 |
| JP | 2003-001472 A | 1/2003 |
| JP | 2004-266281 A | 9/2004 |
| JP | 2004-311906 A | 11/2004 |
| JP | 2006-239717 A | 9/2006 |
| JP | 2008-055467 A | 3/2008 |
| JP | 2009-154198 A | 7/2009 |
| JP | 2010-075982 A | 4/2010 |

OTHER PUBLICATIONS

English Language Translation of JP 2001-269789.*

Japanese Office Action and English Language Translation dated Feb. 18, 2014 (5 pages).

* cited by examiner

LASER PROCESSING APPARATUS

This application is a continuation of PCT/JP2011/059436, filed on Apr. 15, 2011.

BACKGROUND OF THE INVENTION

1. Field of the Invention

The present invention relates to a laser processing apparatus for irradiating a workpiece with a laser beam so as to bore the workpiece at a plurality of predetermined positions and, more particularly, a laser processing apparatus that intends to enhance the positional accuracy in forming a plurality of holes and shorten a cycle time for boring.

2. Description of Related Art

In a conventional laser processing apparatus, a galvano scanner guides a laser beam to an irradiation position on a workpiece, and then, irradiates the workpiece at the laser beam irradiation position, at which holes are formed, with a pulsed laser beam by burst shooting. Two galvano scanners that are orthogonally and biaxially oscillated are respectively oscillated at a high speed, thereby moving the laser beam irradiation position so as to locate it at a target position on the workpiece and stop it there. Thereafter, the burst shooting is completed by irradiating the target position with the pulsed laser beam (see, for example, refer to Japanese Laid-Open Patent Application No. 2009-154198).

However, in the above-described conventional laser processing apparatus, the positional accuracy of the position irradiated with the laser beam by the galvano scanner falls within about ±15 µm. In the case where holes, each having a diameter of, for example, 30 to 50 µm, are to be formed on each of imposers on a plurality of electrode pads formed on a printed wiring board corresponding to an electrode terminal for a semiconductor chip, such as a Ball Grid Array (BGA) or a Chip Size Package (CSP), each of the electrode pads has needed to be formed in a size of about 100 µm square in order to absorb a positional deviation caused by the positional accuracy of the galvano scanner. In this case, an arrangement pitch between the electrode pads on the printed wiring board is normally about 300 µm. Therefore, when a wiring of 100 µm to 150 µm is to be formed between the electrode terminals on the semiconductor chip, an extra space in the wiring ranges from about 25 µm to about 50 µm, thereby inducing a risk of deficiency such as shorting of wiring.

Moreover, in the above-described conventional laser processing apparatus, the problem of the positional accuracy in boring makes it difficult to reduce the size of the electrode pad on the printed wiring board down to less than 100 µm. Therefore, when the arrangement pitch between the electrode terminals on the semiconductor chip is less than 300 µm, the problem can be hardly coped with.

Additionally, a plurality of holes are formed by the laser beam while the galvano scanner repetitively moves the laser beam irradiation position, thereby raising a problem of a long cycle time for forming a plurality of holes.

SUMMARY OF THE INVENTION

Therefore, in view of the above conventional problems, an object of the present invention is to provide a laser processing apparatus that attempts to enhance the positional accuracy in forming a plurality of holes and shorten a cycle time for boring.

In order to achieve the object, the present invention provides a laser processing apparatus for irradiating a workpiece with a laser beam so as to form holes at a plurality of predetermined positions on the workpiece. The laser processing apparatus comprises, from upstream on an optical path of the laser beam: a uniform beam achieving device that achieves uniform intensity distribution of the laser beam; a focusing element that collimates the laser beam emitted from the uniform beam achieving device; and a micro lens array positioned in a manner facing the workpiece and having a plurality of micro lenses formed thereon in a manner corresponding to the plurality of positions on the workpiece.

With the above-described configuration, a uniform beam achieving device achieves uniform intensity distribution of the laser beam; a focusing element collimates the laser beam emitted from the uniform beam achieving device; and a micro lens array, which is positioned in a manner facing the workpiece and has the plurality of micro lenses formed in a manner corresponding to the plurality of predetermined positions on the workpiece, irradiates the workpiece at the plurality of positions with the laser beam, so as to form the holes.

In addition, the uniform beam achieving device is a fly eye lens having a plurality of lenses arranged vertically and laterally.

In addition, the uniform beam achieving device is a homogenizer.

Moreover, the uniform beam achieving device includes rotating about the optical axis of the laser beam.

And then, the uniform beam achieving device is controlled to be rotated once or more during n shots (n is an integer of 2 or more) of the laser beam when the hole having a predetermined depth is formed by the n shots with of laser beam.

According to a first aspect of the invention, the plurality of predetermined positions on the workpiece can be irradiated with the laser beams by using the micro lens array that can be formed by the photolithography, thereby enhancing the positional precision in the formation of the plurality of holes. Moreover, the plurality of positions on the workpiece can be simultaneously irradiated with the laser beam, thereby shortening the cycle time for forming the holes.

Furthermore, according to a second aspect of the invention, the uniform intensity distribution of the laser beams can be achieved, so that the holes are formed in the uniform depth.

Furthermore, according to a third aspect of the invention, the hole having a perfect circular shape can be formed. Consequently, it is possible to prevent any local concentration of a thermal stress caused by the irradiation of the laser beams so as to prevent a crack on the workpiece.

DESCRIPTION OF THE PREFERRED EMBODIMENTS

Figure 1:
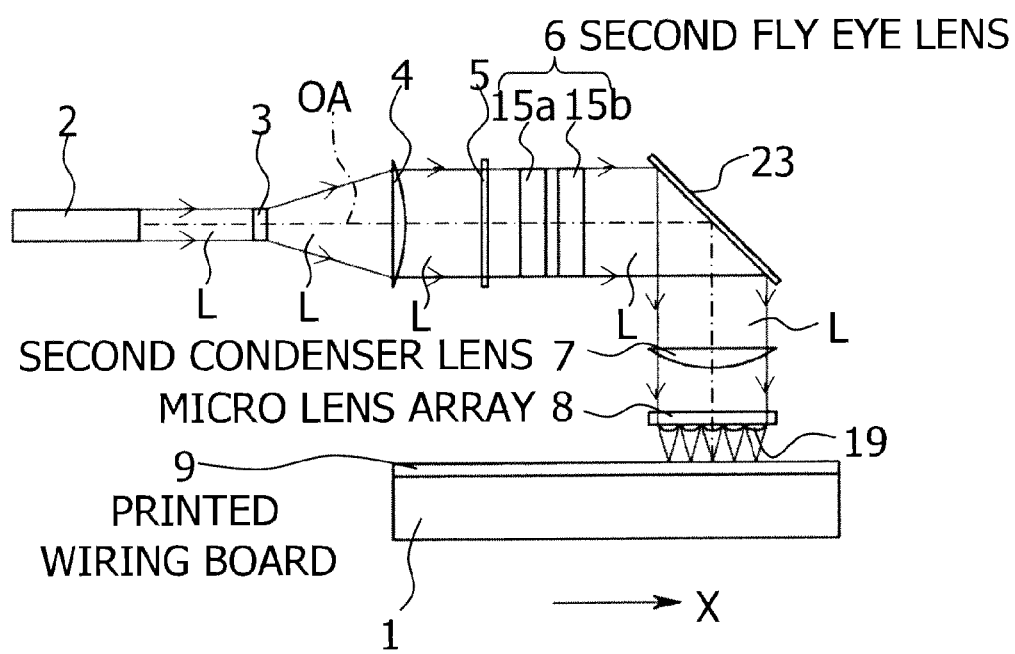
FIG. 1 is a front view showing a laser processing apparatus in an embodiment according to the present invention.

A description will be given below in detail of an embodiment according to the present invention with reference to the attached drawings. FIG. 1 is a front view showing a laser processing apparatus in an embodiment according to the present invention. The laser processing apparatus is adapted to irradiate a workpiece with a laser beam and form holes at a plurality of predetermined positions on the workpiece. The laser processing apparatus includes an XY stage 1, a laser beam source 2, a first fly eye lens 3, a first condenser lens 4, a diffusing plate 5, a second fly eye lens 6, a second condenser lens 7, and a micro lens array 8.

The XY stage 1 is adapted to positionally mount thereon a workpiece such as a printed wiring board 9, and further, to move it within an XY two-dimensional plane. The XY stage 1 includes position sensors on an X-axis and a Y-axis, which are not shown. Moreover, the XY stage 1 is designed to be freely turned by a predetermined angle around the center thereof.

Figure 2:
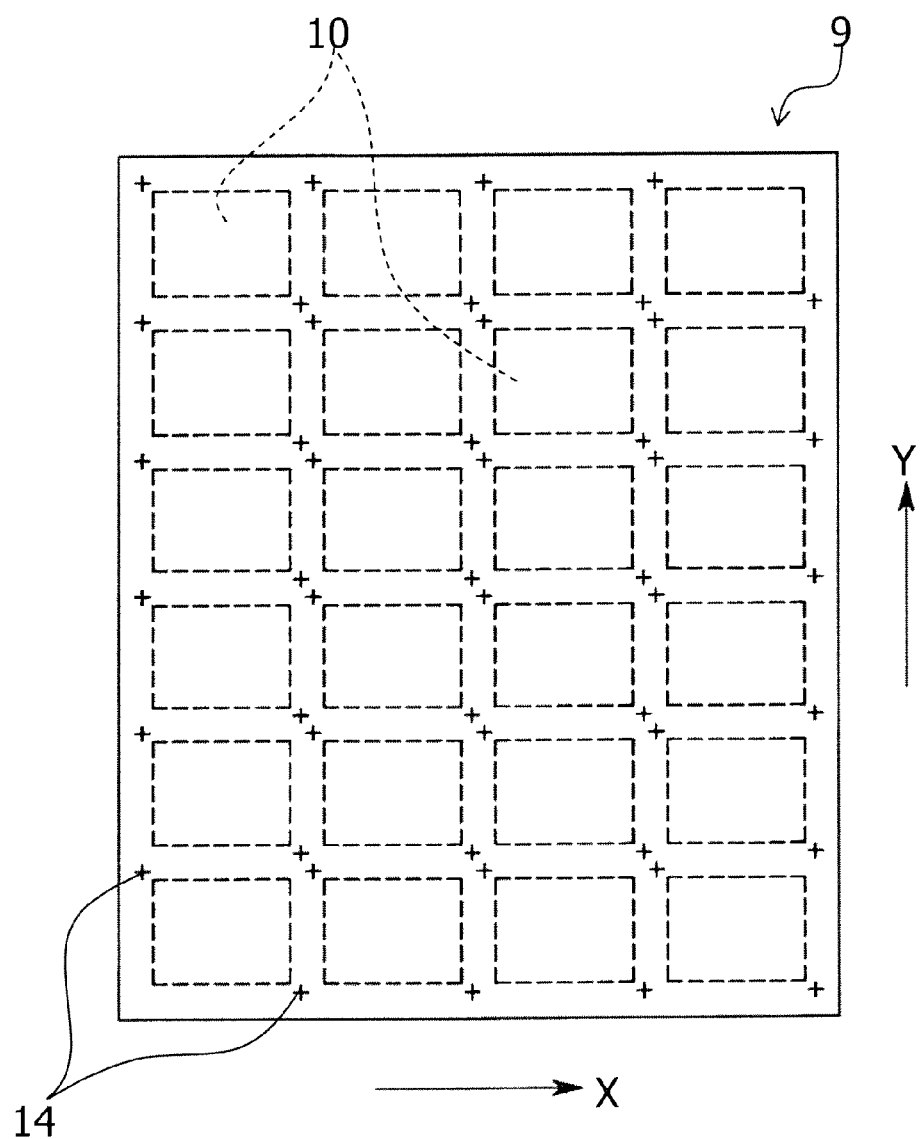
FIG. 2 is a plan view constitutionally exemplifying a printed wiring board used in the laser processing device according to the present invention.
Figure 3:
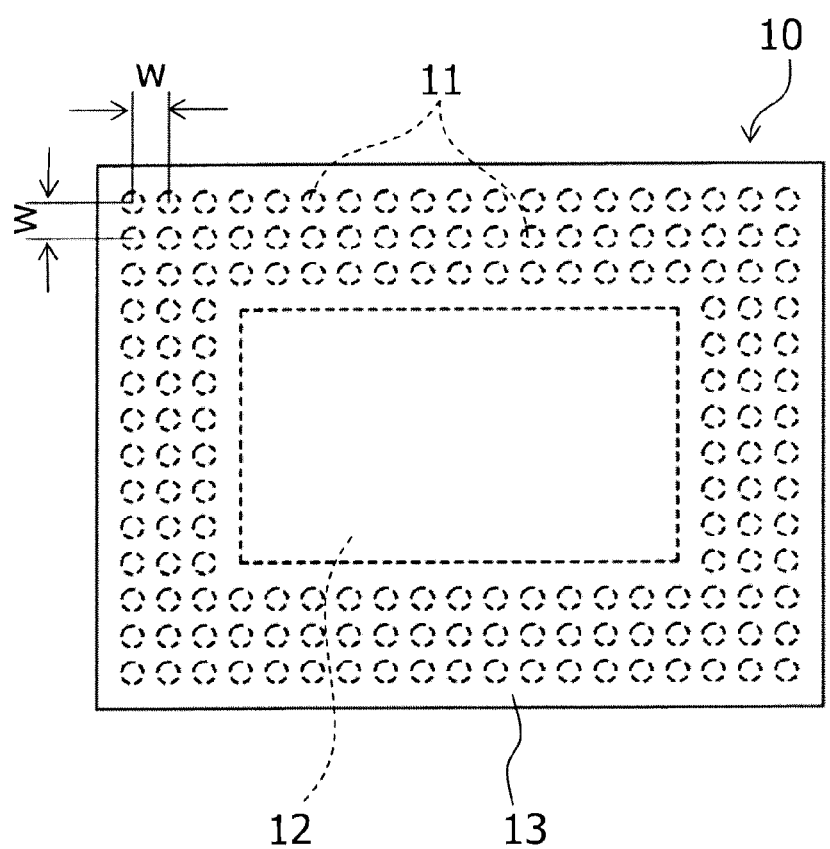
FIG. 3 is a diagram illustrating a chip mounting region on the printed wiring board.

Here, a plurality of rectangular chip mounting regions 10 having semiconductor chips such as BGAs or CSPs mounted thereon are previously set on the printed wiring board 9, as shown in FIG. 2. A plurality of electrode pads 11 are formed on a layer under an uppermost imposer in each of the chip mounting regions 10 in such a manner as to correspond to a plurality of electrode terminals on the semiconductor chip, as shown in FIG. 3. Incidentally, FIG. 3 illustrates the case where the plurality of electrode pads 11 are formed in a peripheral region 13 surrounding a rectangular center region 12 in the chip mounting region 10. Additionally, as shown in FIG. 2, a pair of, for example, cross alignment marks 14 on the board side, which are separated by a predetermined distance from the center of the chip mounting region 10 in directions opposite to each other, are formed on at least one diagonal line in the chip mounting region 10 outside of the rectangular chip mounting region 10.

The laser beam source 2 is positioned above the XY stage 1. The laser beam source 2 is exemplified by a YAG laser for pulse-oscillating a laser beam L, a $CO_2$ laser, or the like. In the present embodiment, explanation will be made on the case where a YAG laser having a wavelength of 355 nm is used. The YAG laser can form a hole having a diameter of about 30 μm.

The first fly eye lens 3 is positioned on an optical path of the laser beam L and downstream of the laser beam source 2. The first fly eye lens 3 achieves the uniform intensity distribution of the laser beam L, and further, fulfills the function of a beam expander for expanding the diameter of an optical flux. For the purpose of that, the first fly eye lens 3 is provided with a plurality of focusing lenses vertically and laterally arranged within the diameter of the optical flux of the laser beam L. Moreover, the first fly eye lens 3 receives the laser beam L irradiated from the laser beam source 2, and then, once focuses the laser beam L at a rear focus position of each of the focusing lenses. Thereafter, the first fly eye lens 3 radially diverges the laser beam L, thereby expanding the diameter of the optical flux of the laser beam L.

The first condenser lens 4 is positioned on the optical path of the laser beam L and downstream of the first fly eye lens 3. The first condenser lens 4 is adapted to collimate the laser beam L emitted from the first fly eye lens 3. The first condenser lens 4 is positioned such that its fore focus position substantially matches with the rear focus position of the first fly eye lens 3 (i.e., an intersection between a plane, which includes the rear focus position of each of the focusing lenses, and the optical axis OA of the laser beam L).

The diffusing plate 5 is positioned on the optical path of the laser beam L and downstream of the first condenser lens 4. The diffusing plate 5 is adapted to prevent any interfere of the plurality of laser beams emitted from the focusing lenses in the first fly eye lens 3 on an incident plane of the second fly eye lens 6, which will be described later. The diffusing plate 5 is a ground glass plate having fine uneven patterns randomly formed thereon.

The second fly eye lens 6 is positioned on the optical path of the laser beam L and downstream of the diffusing plate 5. The second fly eye lens 6 is designed to achieve the uniform intensity distribution of the incident laser beam L, and therefore, serves as a uniform beam achieving device. A couple of lens arrays 15a and 15b provided with a plurality of focusing lenses vertically and laterally arranged within the expanded beam diameter of the laser beam L are positioned opposite to each other in such a manner that the center axes of the focusing lenses corresponding to each other match with each other. The second fly eye lens 6 is designed to be rotated about the optical axis OA (i.e., the center axis of the optical path) of the laser beam L by a rotary drive mechanism, which is not shown. In this case, when a hole having a predetermined depth (i.e., a via hole) is formed by n shots (here, n is an integer of 2 or more) of the laser beam L, the second fly eye lens 6 is controlled to be rotated once or more during the n shots of the laser beam L. In the present preferred embodiment, the hole having a predetermined depth, that is, a hole having a depth of about 40 μm can be formed by the 40 shots of the laser beam L. As a consequence, the second fly eye lens 6 is controlled to be rotated once or more during the 40 shots of the laser beam L.

The second condenser lens 7 is positioned on the optical path of the laser beam L and downstream of the second fly eye lens 6. The second condenser lens 7 serves as a focusing element for collimating the laser beam L emitted from the second fly eye lens 6. The second condenser lens 7 is positioned such that its fore focus position substantially matches with the rear focus position of the second fly eye lens 6 (i.e., an intersection between a plane, which includes the rear focus position of each of the focusing lenses in the downstream lens array 15b out of the pair of lens arrays 15a and 15b, and the optical axis OA of the laser beam L). In FIG. 1, reference numeral 23 designates a totally reflecting mirror for turning the optical path at right angles.

Figure 4:
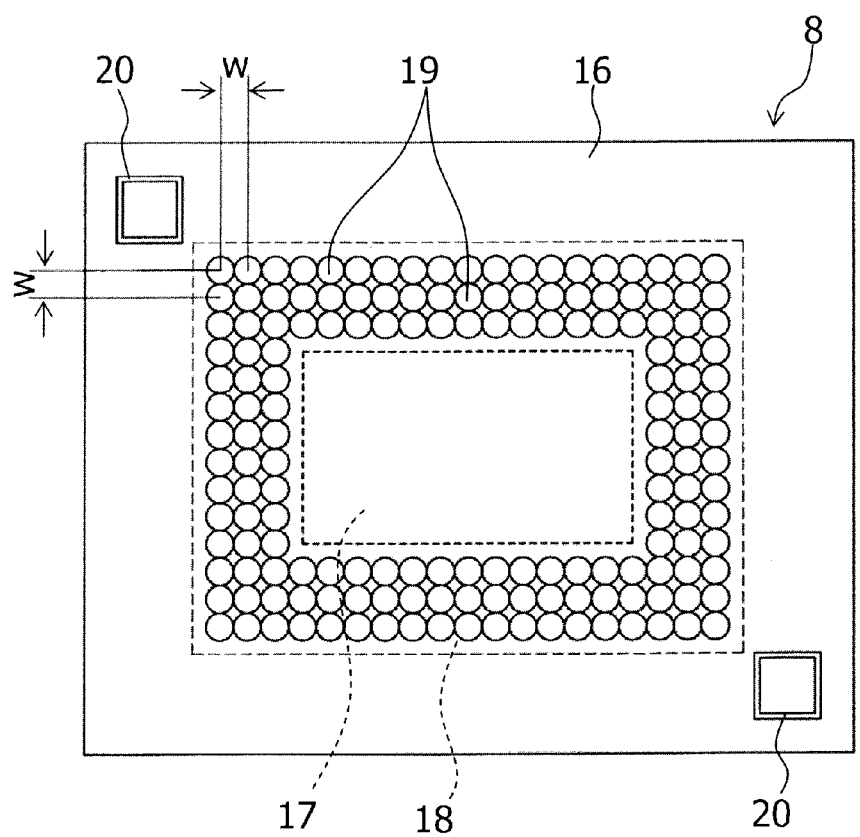
FIG. 4 is a plan view constitutionally exemplifying a micro lens array in the laser processing apparatus.

The micro lens array 8 is positioned on the optical path of the laser beam L and downstream of the second condenser lens 7 in such a manner as to face the printed wiring board 9. The micro lens array 8 has a plurality of micro lenses 19 formed at positions corresponding to the plurality of electrode pads 11 formed in advance on the printed wiring board 9. Specifically, the plurality of micro lenses 19 are formed in a peripheral region 18 surrounding a rectangular center region 17 of a rectangular transparent base 16, as shown in, for example, FIG. 4. In this case, each of intervals w between the center lines of the plurality of micro lenses 19 arranged vertically and laterally is equal to an arrangement pitch w between the electrode pads 11 on the printed wiring board 9 (see FIG. 3). A pair of frame-like alignment marks 20 on the lens side, for example, is formed on at least one diagonal of the rectangular transparent base 16 in a manner corresponding to the alignment marks 14 on the board side on the printed wiring board 9. The above-described micro lens array 8 can be fabricated by utilizing, for example, a photolithographic technique. The arrangement pitch of each of the micro lenses 19 can be set to a precision from sub micron to several microns.

An aligning camera, which is not shown, positioned above the micro lens array 8 captures the alignment mark 20 on the lens side and the alignment mark 14 on the board side positioned under the mark 20 in the same field of view; measures deviations of the alignment marks 20 and 14 from, for example, the centers; and thus, moves the XY stage 1 in such a manner that the deviations become zero so as to align the micro lens array 8 with the chip mounting region 10 of the printed wiring board 9.

Here, the micro lens array 8 may be provided with or without a light shielding film in a region outside of the micro lenses 19. Even if no light shielding film is formed, the laser beam L transmitting outside of the micro lenses 19 cannot be focused on the printed wiring board 9. Therefore, the energy of the laser beam L cannot be concentrated on the printed wiring board 9, and thus, the laser beam L cannot process the printed wiring board 9.

Next, a description will be given of operation in the laser processing apparatus such configured as described above.

First of all, the printed wiring board 9 is positionally fixed and mounted on the XY stage 1. Subsequently, when a start switch is turned on, the XY stage 1 is moved within an XY plane, so that a first one of the chip mounting regions 10 on the printed wiring board 9 (e.g., the chip mounting region 10 located at an upper left position in FIG. 2) is located right under the micro lens array 8.

Thereafter, the aligning camera, which is not shown, captures the alignment mark 20 on the lens side of the micro lens array 8 and the alignment mark 14 on the board side within the same field of view and forms an image. The resultant image is processed by a controller, which is not shown. And then, the distances between the center and the alignment mark 20 on the lens side and between the center and the alignment mark 14 on the board side, for example, are measured. The XY stage 1 is finely moved in such a manner that the distances between the centers and the marks become the predetermined value, for example, zero. Thus, the micro lens array 8 is aligned with the first chip mounting region 10 on the printed wiring board 9. The XY stage 1 is rotated about the center axis, thus achieving the alignment, as required.

Upon completion of the alignment, the laser beam source 2 is turned on to radiate the pulsed laser beam L that is oscillated at a constant frequency. The intensity distribution of the laser beam L is made to be uniform by the first fly eye lens 3, and further, the diameter of the optical flux is increased so that the laser beam L is incident into the first condenser lens 4.

In the laser beam L that has been incident into the first condenser lens 4, the main light beam of the laser beam emitted from each of the focusing lenses in the first fly eye lens 3 is collimated with the optical axis OA by the first condenser lens 4, and then, is incident into the diffusing plate 5.

In the diffusing plate 5, the laser beam L is diffused in a random direction within a predetermined angular range. In this manner, the laser beam emitted from each of the focusing lenses in the first fly eye lens 3 cannot interfere on the incident side of the second fly eye lens 6, thus preventing any generation of an interference fringe.

The intensity distribution of the laser beam L emitted from the diffusing plate 5 is made to be uniform by the second fly eye lens 6. Moreover, the main optical beam of the laser beam emitted from each of the focusing lenses in the second fly eye lens 6 is collimated with the optical axis OA by the second condenser lens 7, and then, the light beam L is incident into the micro lens array 8.

Figure 5:
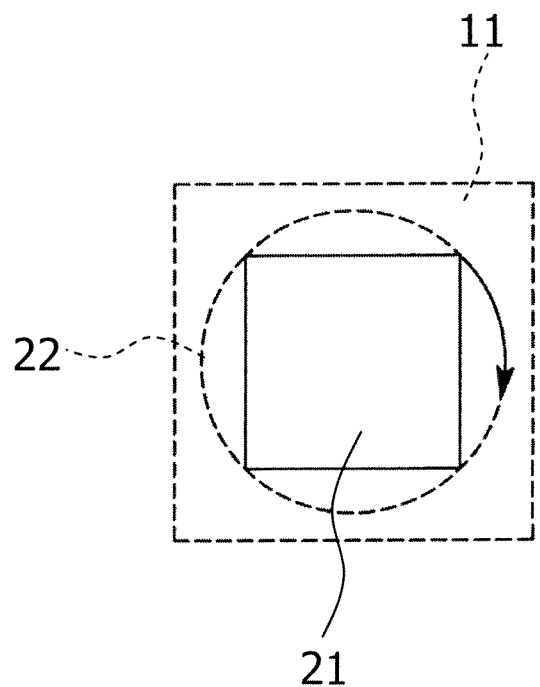
FIG. 5 is a diagram illustrating boring by the laser processing apparatus.

Each of the micro lenses 19 in the micro lens array 8 focuses the laser beam L at a position facing each of the electrode pads 11 of the printed wiring board 9, and then, forms a beam spot having a shape similar to a shape of an end on the emission side of the second fly eye lens 6, for example, a square, on the printed wiring board 9. Consequently, a square hole 21, for example, is formed in the imposer on the electrode pad 11 in the printed wiring board 9, as shown in FIG. 5.

In the above-described embodiment, in the case where the hole having the predetermined depth (e.g., 40 μm) is formed by the n shots (n is an integer of 2 or more, for example, the 40 shots) of the laser beam L, the second fly eye lens 6 is rotated once or more, during the n shots (the 40 shots) of the laser beam L, about the optical axis OA (i.e., the center axis of the optical path) by the rotary drive mechanism, which is not shown. In this manner, the plurality of square beam spots irradiated on the printed wiring board 9 bore the imposer on the plurality of electrode pads 11 while being turned in, for example, a direction indicated by an arrow in FIG. 5. As a consequence, a plurality of holes 22, each having a circular cross section, are simultaneously formed around the center axis of each of the micro lenses 19 in the micro lens array 8 on each of the electrode pads 11. In this case, the arrangement pitch between the holes 22 depends upon the formation precision of each of the micro lenses 19 in the micro lens array 8, and therefore, its positional precision is about sub micron to several microns.

Subsequently, the XY stage 1 is moved, for example, leftward in FIG. 2, by a distance equal to the arrangement pitch of the chip mounting regions 10, and thus, a second one of the chip mounting regions 10 is positioned right under the micro lens array 8. Thereafter, in the same manner as described above, the micro lens array 8 and the second chip mounting region 10 are aligned with each other, and then, the second fly eye lens 6 is rotated while irradiating the laser beam L so that another plurality of holes 22 are formed in a manner corresponding to the plurality of electrode pads 11 in the second chip mounting region 10. This operation is repeated thereafter so that holes are formed in all of the chip mounting regions 10 in the printed wiring board 9.

According to the present invention, the micro lens array 8 having the plurality of micro lenses 19 in a manner corresponding to the plurality of electrode pads 11 in the printed wiring board 9 focuses the laser beam L on each of the plurality of electrode pads 11, thereby achieving the boring operation. As a consequence, the positional precision of the boring can be remarkably enhanced in comparison with the prior art in which the galvano mirror stepwise moves the laser beam L to form the holes. Thus, in the case where the holes 22, each having the same diameter as a conventional diameter, are formed in the same arrangement pitch, the size of the electrode pad 11 can be reduced more than a conventional size. Therefore, even when a wiring is formed between the adjacent electrode pads 11, a sufficient extra space can be secured, thereby reducing the deficiency such as shorting of the wiring.

Additionally, in the case where an interval between electrode terminals in a semiconductor chip is reduced, the problems can be readily coped with by reducing the diameter of the micro lens 19 accordingly as well as preparing the micro lens array 8 having the reduced interval.

In addition, the plurality of holes can be simultaneously formed with respect to the plurality of electrode pads 11 in one of the chip mounting regions 10, and therefore, the cycle time for forming the holes can be shortened.

Incidentally, although the uniform beam achieving device has been exemplified by the fly eye lens (i.e., the second fly eye lens 6) in the above-described embodiment, the present invention is not limited to this, and therefore, the uniform beam achieving device may be a homogenizer.

Moreover, although the focusing element has been exemplified by the condenser lens in the above-described embodiment, the present invention is not limited to this, and therefore, the focusing element may be a concave mirror.

Furthermore, although the XY stage 1 has been finely moved so as to align the micro lens array 8 with the printed wiring board 9 in the above-described preferred embodiment, the present invention is not limited to this, and therefore, only the micro lens array 8 may be moved or both of the micro lens array 8 and the XY stage 1 may be moved.

In the above description, although the workpiece has been exemplified by the printed wiring board 9, the present invention is not limited to this, and therefore, the workpiece may be anything as long as it is a member that has the plurality of holes 22 to be formed with the laser beam.

It should be noted that the entire contents of Japanese Patent Application No. 2010-102904, filed on Apr. 28, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A laser processing apparatus comprising, from upstream on an optical path of a laser beam:
   a uniform beam achieving device that achieves a uniform intensity distribution of the laser beam and emits a uniform laser beam;
   a focusing element that collimates the laser beam emitted from the uniform beam achieving device; and
   a micro lens array positioned in a manner facing a workpiece and having a plurality of micro lenses formed thereon in a manner corresponding to a plurality of predetermined positions on the workpiece,
   wherein during laser processing, while the uniform beam achieving device is rotated about an optical axis of the laser beam one or more times, the uniform laser beam emitted from the uniform beam achieving device passes through the micro lens array and is then incident on the workpiece, to form a circular hole around a center axis of each of the plurality of micro lenses at each of the plurality of predetermined positions on the workpiece.

2. The laser processing apparatus according to claim 1, wherein the uniform beam achieving device is a fly eye lens having a plurality of lenses arranged vertically and laterally.

3. The laser processing apparatus according to claim 1, wherein the uniform beam achieving device is a homogenizer.

4. The laser processing apparatus according to claim 1, wherein the uniform beam achieving device is controlled to be rotated at least once during n shots (n is an integer of 2 or more) of the laser beam when a hole having a predetermined depth is formed by the n shots of the laser beam.

* * * * *